Jan. 29, 1952 W. C. WILSON 2,583,918
UNIVERSAL TRACTOR AND IMPLEMENT CAB
Filed May 24, 1948 3 Sheets-Sheet 1
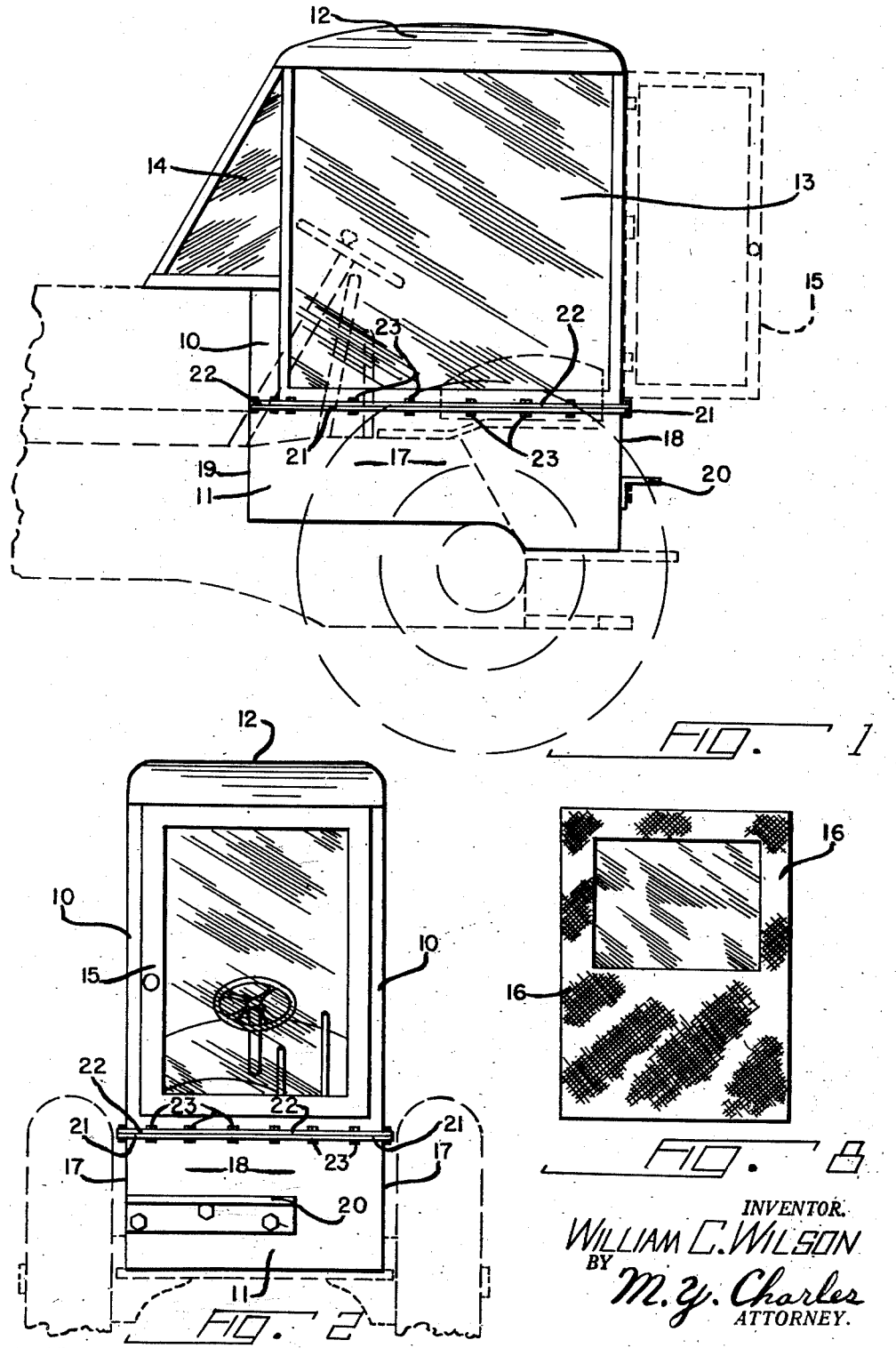
INVENTOR.
WILLIAM C. WILSON
BY
M. Y. Charles
ATTORNEY.

Jan. 29, 1952     W. C. WILSON     2,583,918
UNIVERSAL TRACTOR AND IMPLEMENT CAB
Filed May 24, 1948     3 Sheets-Sheet 3
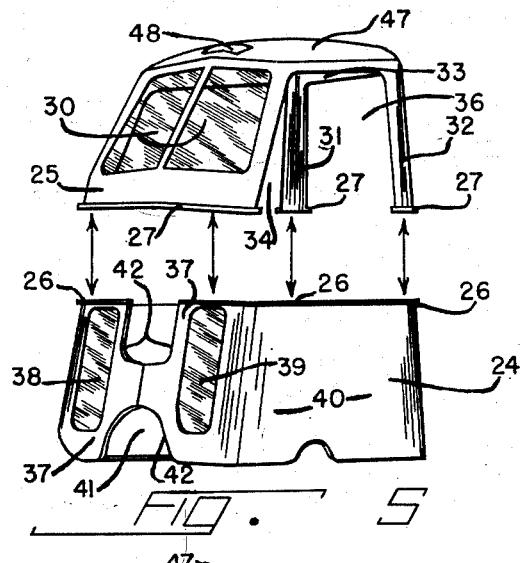
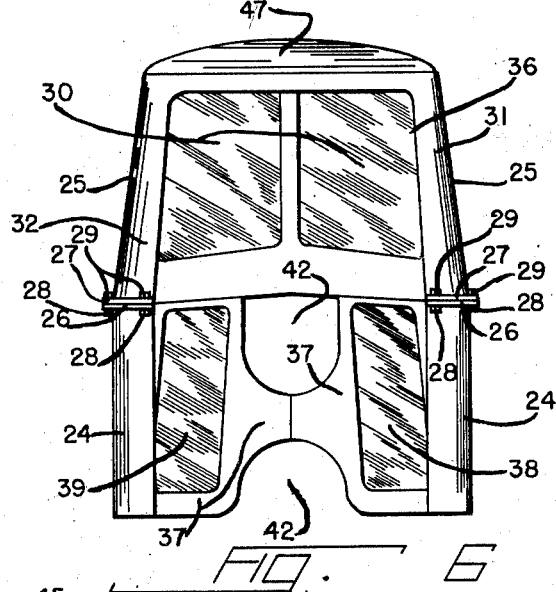
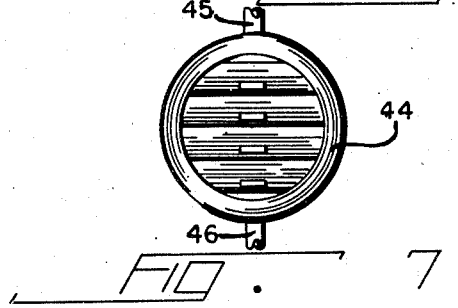
INVENTOR.
WILLIAM C. WILSON
BY
M. Y. Charles
ATTORNEY.

Patented Jan. 29, 1952

2,583,918

UNITED STATES PATENT OFFICE 2,583,918

UNIVERSAL TRACTOR AND IMPLEMENT CAB

William C. Wilson, Lenora, Kans.

Application May 24, 1948, Serial No. 28,803

3 Claims. (Cl. 296—102)

My invention relates to an improvement in removable cabs for farm machinery.

The object of my invention is to provide a tractor or implement cab of the kind mentioned that is so constructed as to be quickly and easily separated at a point near the center for the removal of the cab from the machine.

Another object of my invention is to provide a tractor or implement cab of the kind mentioned that is designed to give the greatest possible vision for the operator of the machine.

Another object of my invention is to provide a cab of the kind mentioned that is made in two sections, an upper section and a lower section and the joining parts of the two sections have the same dimensions so that the upper section can be interchangeably removed and mounted on any one of numerous adapter sections. The lower portion of each adapter section will vary in size and shape so as to fit and be received on a specific machine or implement. This makes it possible to equip a number of machines with adapter sections made for that particular machine and the upper cab section will be interchangeably receivable on any of the adapter sections. This makes it possible to have a cab on any number of machines without the expense of a complete cab for each machine.

A further object of my invention is to provide a tractor or implement cab of the kind mentioned that has either removable and adjustable glass panels or canvas curtains with windows conveniently located therein and in the back of the cab is located a door or canvas curtain for the convenience of entering the cab.

A still further object of my invention is to provide a tractor or implement cab of the kind mentioned that has a heater and air conditioner installed therein for the comfort of the operator of the machine and in the top of the cab is located a ventilator that is adapted to be opened or closed as the operator desires.

A still further object of my invention is to provide a tractor or implement cab of the kind mentioned in which the glass, or canvas panels or the door, may be installed in the back or in either side of the cab as the case may be.

A still further object of my invention is to provide a tractor or implement cab of the kind mentioned that is so light in weight that one man can install the cab onto the tractor or remove the cab from the tractor or implement as the case may be.

A still further object of my invention is to provide a tractor or implement cab of the kind mentioned that is neat in design, sturdy in construction, and comparatively cheap to build and buy.

Now referring to the accompanying drawings in which similar numerals of reference designate the same parts throughout the several figures of the drawings.

Fig. 1 is a side view of one form of my tractor and implement cab device, the cab is shown mounted onto a tractor and the tractor is shown in dotted lines.

Fig. 2 is a rear view of my tractor and implement cab device, the tractor in this view is shown in dotted lines.

Fig. 5 is a perspective view of my modified form of tractor and implement cab device, the device in this view is shown alone and the upper section is raised above the lower section to illustrate how easily and simple it is to disassemble the cab.

Fig. 6 is a rear view of my modified form of tractor and implement cab device, the device in this view is shown along with the two halves bolted together, the rear opening in this view may be closed by a door or a curtain as the case may be.

Fig. 7 is a front view of a heater and air conditioner, the details of which are not shown.

Fig. 8 is a side view of a curtain to be used in the entrance to the cab if desired, in place of the door.

Figure 3:
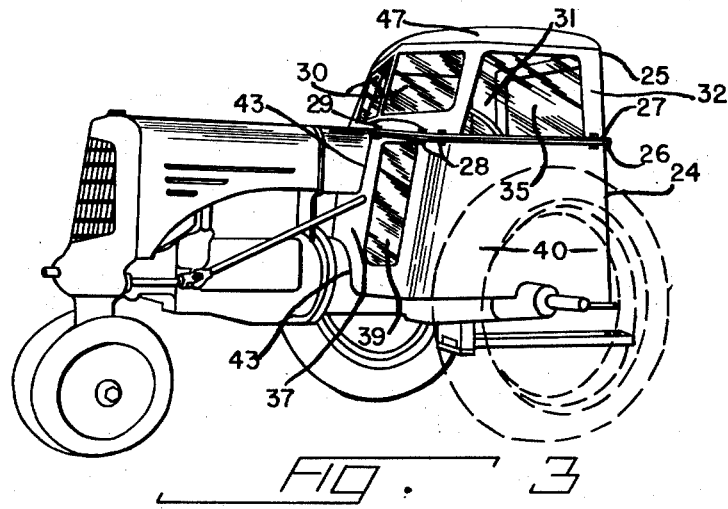
Fig. 3 is a perspective view of a modified form of my tractor and implement cab device, this view shows the cab device mounted onto a tractor and ready for use.

The cab shown in Figs. 1 and 2 is seen as having two sections 10 and 11 and a top 12. The section 10 is provided with side windows 13 and windshield 14 and a rear door 15 which may be substituted for the cloth curtain 16 shown in Fig. 8. The side window 13 may also be substituted for the cloth curtain 16 if desired. The lower section 11 is formed to fit the machine upon which the cab is to be installed and has sides 17, a back 18 and a front 19 that fits around the upper portion of the body of the tractor. The floor of the section 11 is the common platform that is already on a tractor or implement upon which an operator must stand or ride to operate the machine. On the back plate 18 is bolted a step 20 to insure ease of the operator in entering the cab. On the top edge of the lower section 11 is formed an outwardly turned flange element 21, and on the lower edge of the top section 10 is formed an outwardly turned flange element 22 that exactly fits onto the outwardly turned flange element 21 and a plurality of bolts 23 with their respective nuts hold the two sections 10 and 11 together.

Now in Figs. 3, 4, 5 and 6 is shown a modified form of my tractor and implement cab device, and the device is seen in the drawings as having two sections 24 and 25. The two sections 24 and 25 are held securely together by matching flanges 26 and 27 and bolts 28 inserted through holes in the two flanges 26 and 27 and nuts 29 are threaded thereon. The upper section 25 is the same on all models for the different types of equipment and are provided with a windshield 30 that can be either divided and sloping as shown in the drawings or straight if desired.

Two posts 31 and 32 are provided at each of the rear corners for the rear support thereof. The side spaces 33 and 34 can be weather proofed with glass 35 as shown in Fig. 3 or with the cloth curtain 16 shown in Fig. 8.

Figure 4:
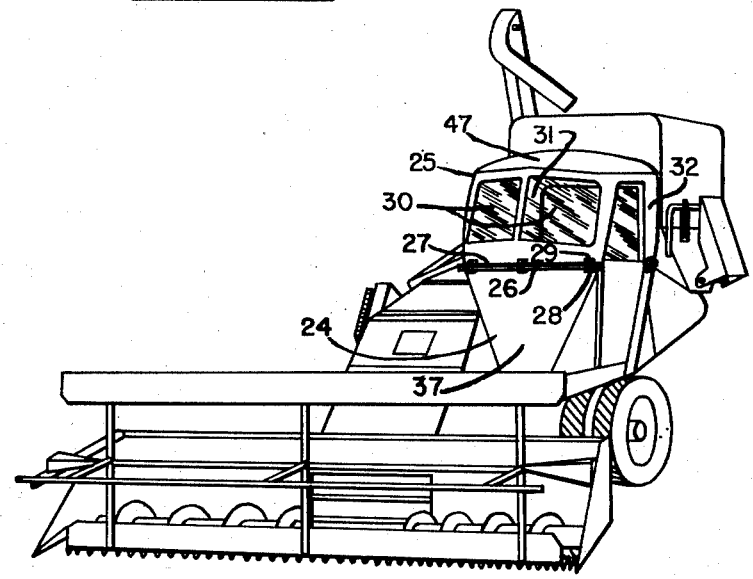
Fig. 4 is a perspective view of the modified form of tractor and implement cab device, the device in this view is shown mounted onto a combine and ready for use.

The rear opening 36 on most machinery is the entrance to the cab and can be weather proofed with either a door that opens and closes or with the cloth curtain 16 shown in Fig. 8. In Fig. 4 of the drawings the cab device is shown mounted on a combine and the entrance to the cab is on the side of the cab. The design of the cab will therefore determine whether a door or cloth curtain at this side opening as well as at the back in the other figures is desirable.

The base section 24 of the device is built differently to fit on the various different types of tractors and machinery, but the upper outwardly turned flange 26 on all models always conforms and fits perfectly onto the matching flange 27 of the upper section 25.

The base section 24 is provided with a front portion 27 that is provided with a pair of windows 38 and 39 for visibility to the operator. In the case of the combine model shown in Fig. 4, no window is shown but a window may be installed in the front panel 37 if it becomes necessary to do so. The two sides 40 and 41 of the lower section 24 are solid and rigidly support the upper section 25 at all times. The back portion is open to receive a door or the cloth curtain 16 as the case may be. The front portion 37 is provided with the needed opening 42 to enable the base section 24 to be mounted onto a tractor as shown at 43 in Fig. 3 of the drawings.

The lower ends of the base section 24 can be fastened securely to the platform of the tractor by screws, bolts or any satisfactory means of fastening that may be desired.

In Fig. 7 of the drawings is shown a heater air conditioning unit 44 with an inlet pipe 45 and a discharge pipe 45 and a discharge pipe 46. This unit 44 may be any satisfactory unit to warm and cool the cab as the case may be. The top 47 of the cam is provided with a small ventilator 48 to admit a stream of air if needed.

Now the operation of my device is as follows.

After the base section 11 or 24 is designed to fit the machine on which the cab is to be installed the base section 11 or 24 is placed on the machine and fastened securely thereto. Then the upper section 10 or 25 is placed on the top of the lower section 11 or 24 with the respective flanges 21, 22 and 26, 27 fitted snugly together and their respective bolts tightened up to securely hold the two sections 10 and 11 or 24 and 25 tightly together. The doors and windows may then be installed if desired or left off as the operator of the machine chooses. The disassembly of the cab is the same above described procedure in reverse, except the bottom section 11 or 24 need not ever be removed as no part of that section will hinder the operation of the machine and the sides of the lower sections 11 and 24 will serve as a protection for the operator.

Now while the device as shown and above described is probably the preferred form of the device, it is to be understood that such modifications may be employed as lie within the scope of the appended claims without departing from the spirit and intention of the invention.

Now having fully shown and described my invention, what I claim is:

1. A cab device of the kind described; said cab comprising an upper section and a lower section, the lower section being an adaptor section having closure walls therearound, the lower portion of said adapter section being variable in shape to fit a portion of a specific machine, the upper portion of the adapter section being standard in formation, and the walls thereof changing in shape from the bottom of the adapter section to a standard shape at the top of said adapter section, the upper section of said cab being standard in formation so as to be receivable on the said standard shape of any adapter section, said upper section having openings therein for windows and a door, the adapter section having a door opening therein arranged for registry with the upper section door opening, and means for fastening the two sections together.

2. In a cab device of the kind described; the structure defined in claim 1, said window openings having transparent closure elements therein, and closure means for the door opening formed in the upper and adapter sections.

3. In a cab device of the kind described; the structure defined in claim 1, said window openings having transparent closure elements therein, and closure means for the door opening formed in the upper and adapter section, and openable and closable ventilator means in the upper portion of said cab.

WILLIAM C. WILSON.

REFERENCES CITED

The following references are of record in the file of this patent:

UNITED STATES PATENTS

| Number | Name | Date |
| --- | --- | --- |
| 2,267,227 | Williams | Dec. 23, 1941 |
| 2,479,036 | Campbell | June 23, 1947 |